United States Patent [19]

Dissett

[11] Patent Number: 5,524,509
[45] Date of Patent: Jun. 11, 1996

[54] DIFFERENTIAL WITH PRELOAD SPRING MEANS

[75] Inventor: Walter L. Dissett, Farmington Hills, Mich.

[73] Assignee: Titan Wheel International, Inc., Quincy, Ill.

[21] Appl. No.: 374,091

[22] Filed: Jan. 18, 1995

[51] Int. Cl.⁶ .................................................. F16H 48/14
[52] U.S. Cl. ................................................ 74/650; 475/220
[58] Field of Search ............................. 74/650; 475/220, 475/230, 248

[56] References Cited

U.S. PATENT DOCUMENTS

| | | |
|---|---|---|
| 2,329,059 | 9/1943 | Knoblock . |
| 2,638,794 | 5/1953 | Knoblock . |
| 2,667,088 | 1/1954 | Myers . |
| 3,283,611 | 11/1966 | Weismann et al. .................. 74/650 |
| 3,791,238 | 2/1974 | Bokovoy . |
| 3,935,753 | 2/1976 | Williams ................................ 74/650 |
| 4,424,725 | 1/1984 | Bawks . |
| 4,557,158 | 12/1985 | Dissett et al. . |
| 4,569,250 | 2/1986 | Nellums ................................. 74/650 |
| 4,644,818 | 2/1987 | Choma et al. . |
| 4,745,818 | 5/1988 | Edwards . |

Primary Examiner—Charles A. Marmor
Assistant Examiner—Nathan O. Jensen
Attorney, Agent, or Firm—Laubscher & Laubscher

[57] ABSTRACT

An improved differential mechanism of the holdout ring type, characterized by the provision of a pair of annular thrust blocks engaged by sets of Belleville disc-spring washers which bias a pair of side gears axially outwardly apart against a pair of annular thrust washers, respectively, non-rotatably supported by the differential housing. By loading the side gears in the axial direction, the side gear radial freedom of movement is restricted, whereby the differential chatter and noise level during operation are significantly reduced.

9 Claims, 5 Drawing Sheets

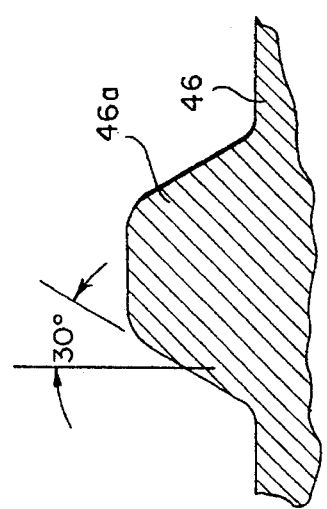
FIG.7
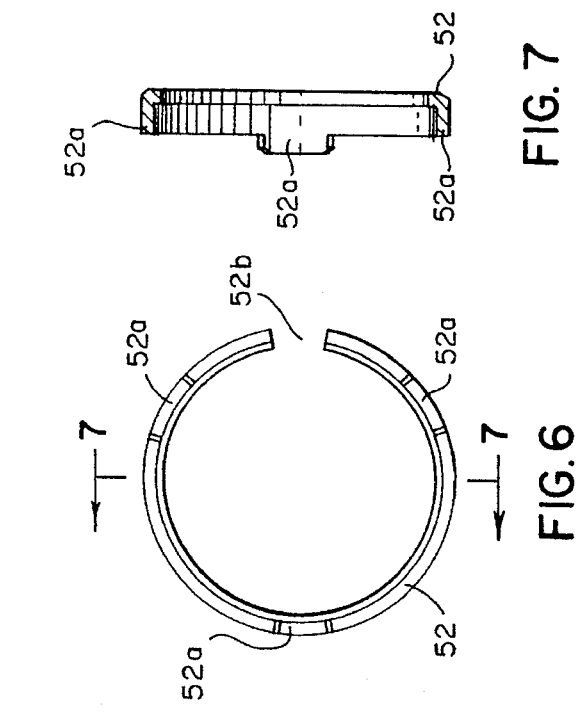
FIG.6
FIG.5
FIG.4
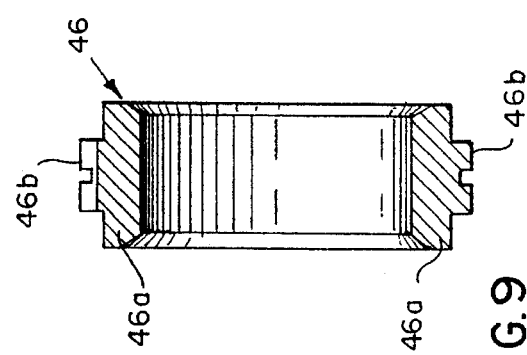
FIG.10
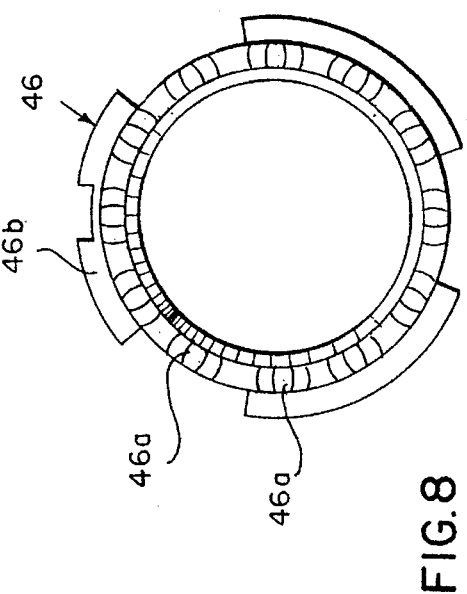
FIG.9
FIG.8

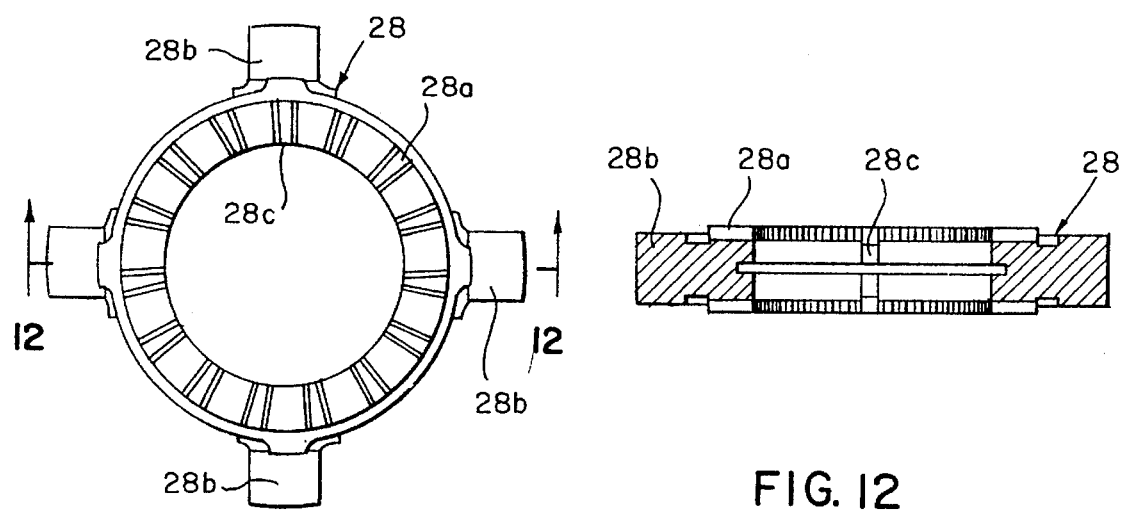
FIG. 11
FIG. 12
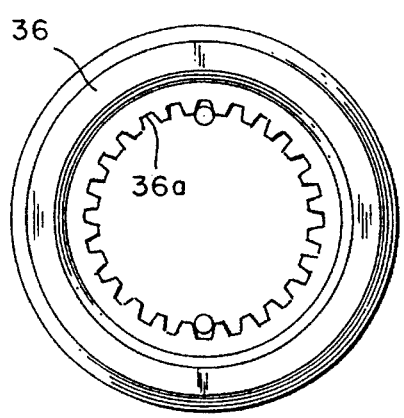
FIG. 13
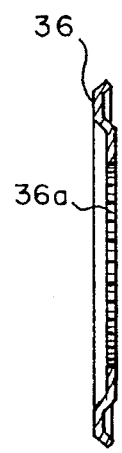
FIG. 14

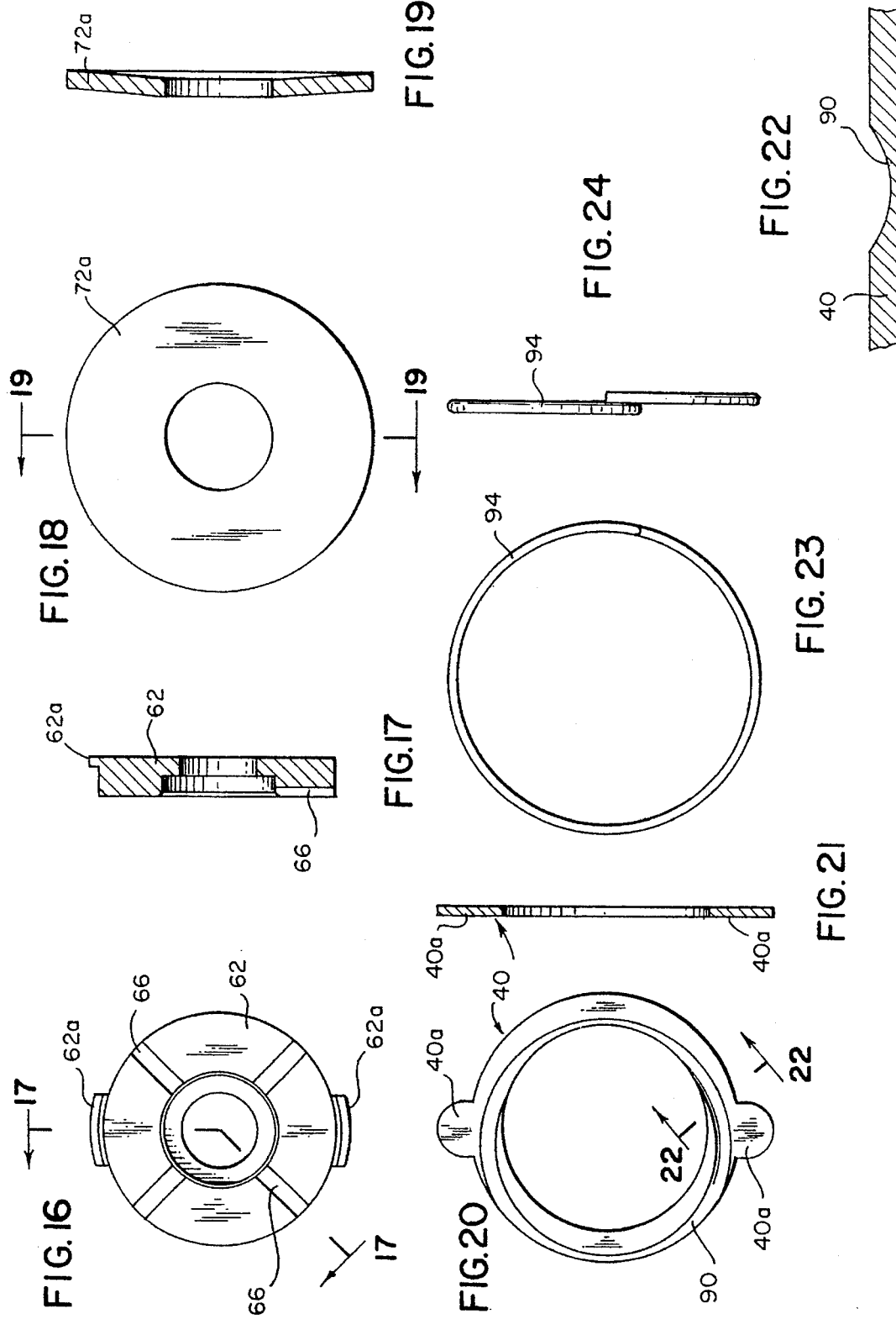

DIFFERENTIAL WITH PRELOAD SPRING MEANS

SPECIFICATION

1. Statement of the Invention

This invention relates to an improved differential of the holdout ring type for rotatably driving a pair of aligned axially-spaced output shafts from a rotatably driven input shaft, characterized by the provision of resilient means for biasing a pair of side gears axially outwardly apart toward contiguous engagement with a pair of annular thrust washers mounted on the interior of the differential housing, thereby to significantly reduce the operating noise level of the differential.

2. Brief Description of the Prior Art

Differential mechanisms of the holdout ring type are well known in the patented prior art, as evidenced by the patents to Bokovoy U.S. Pat. No. 3,791,238, Bawks U.S. Pat. No. 4,424,725, Dissett et al U.S. Pat. No. 4,557,158, and Edwards et al U.S. Pat. No. 4,745,818 (each assigned to the same assignee as the present invention). In such differentials, upon the overrunning of one output shaft relative to the other, the driven clutch member associated with the overrunning shaft is disengaged from the center driving member by center cam means, an associated holdout ring being rotated slightly from an inoperative position to an operative position to maintain the driven clutch member disengaged until the overrunning condition is terminated.

While the known differentials operate generally satisfactorily, undesirable noise is generated when going from the driven or engaged mode of operation to the disengaged cammed-out mode of operation.

The present invention was developed to provide an improved holdout ring type differential having reduced noise characteristics.

SUMMARY OF THE INVENTION

Accordingly, a primary object of the present invention is to provide an improved overrunning holdout ring type differential in which thrust means engaged by a pair of spring means bias a pair of side gears axially outward.

According to a more specific object of the invention, a pair of annular thrust block members arranged concentrically within a center cam member are engaged by sets of Belleville disc-spring washers which bias a pair of side gears outwardly apart against a pair of thrust washers grounded in the differential housing and arranged at the remote ends of the side gears.

By loading the side gears in the axial direction, the side gear radial freedom of movement is restricted, thereby significantly reducing the tooth-to-tooth noise normally expected from this type of overrunning differential when shifting from the engaged condition to the disengaged cammed out condition (and vice versa). Additionally, tooth wear is reduced, thereby increasing the overall life of the differential.

BRIEF DESCRIPTION OF THE DRAWINGS

Other objects and advantages of the invention will become apparent from a study of the following specification, when viewed in the light of the accompanying drawings, in which:

FIG. 4 is an end view of one of the clutch members of FIG. 1, and

FIG. 5 is a sectional view taken along line 5—5 of FIG. 4;

FIG. 6 is an end view of one of the holdout rings of FIG. 1, and

FIG. 7 is a sectional view taken along line 7—7 of FIG. 6;

FIGS. 8 and 9 are end and sectional views, respectively, of the cam member of FIG. 1;

FIG. 10 is a detailed sectional view of one of the cam teeth of the cam member of FIG. 8;

FIG. 11 is an end view of the central driving member of FIG. 1, and

FIG. 12 is a sectional view taken along line 12—12 of FIG. 11;

FIGS. 13 and 14 end end and sectional views, respectively, of one of the spring retainer members of FIG. 1;

FIG. 16 is an end view of one of the thrust block members of FIG. 1, and

FIG. 17 is a sectional view taken along line 17—17 of FIG. 16;

FIG. 18 is a plan view of one of the Belleville spring washers, and

FIG. 19 is a sectional view taken along 19—19 of FIG. 18;

FIGS. 20 and 21 are end and sectional views, respectively, of one of the thrust washers of FIG. 1, and FIG. 22 is a detailed sectional view taken along line 22—22 of FIG. 20; and FIGS. 23 and 24 are front and side elevational views, respectively, of one of the split locking ring means of FIG. 1.

DETAILED DESCRIPTION

Figure 1:
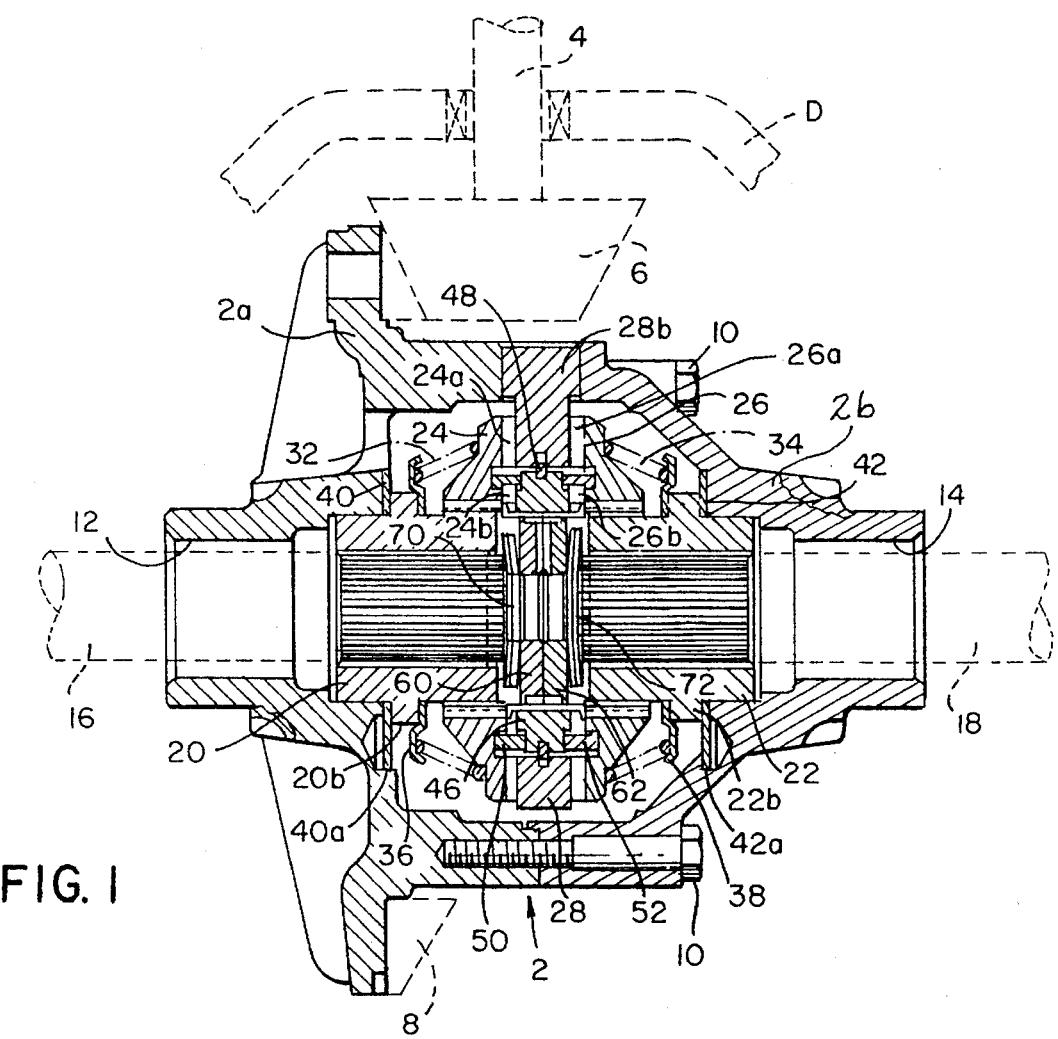
FIG. 1 is sectional view of the differential mechanism of the present invention.

Referring first more particularly to FIG. 1, the differential mechanism of the present invention includes a sectional housing 2 that is rotatably driven within the axle case D by the vehicle drive shaft 4 via drive pinion 6 and ring gear 8. The housing includes two sections 2a and 2b that are bolted together by bolt means 10. At opposite ends, the housing includes opposed openings 12 and 14 for receiving the driven left and right wheel shafts 16 and 18, respectively, and side gears 20 and 22 (FIGS. 2 and 3) are non-rotatably splined to the adjacent ends of the wheel shafts 16 and 18, respectively. Slidably mounted for axial displacement on the side gears 20 and 22 are clutch members 24 and 26 (FIGS. 4 and 5) having clutch teeth 24a and 26a that engage corresponding clutch teeth 28a (FIGS. 11 and 12) on the central driving member 28. The central driving member 28 is non-rotatably connected with the housing 2 by means of radial projections 28b that are retained between the sections 2a and 2b of the housing 2. The clutch members are normally biased toward each other on opposite sides of the center drive member 28 by compression springs 32 and 34, respectively. At their remote ends, the springs 32 and 34 engage spring retainer members 36 and 38, respectively, that are mounted concentrically on the side gears in abutting engagement with peripheral circumferentially side gear extending rib portions 20b and 22b, respectively. The remote sides of the circumferential rib portions 20b and 22b of the side gears 20 and 22 engage thrust washers 40 and 42, respectively, that are captured and non-rotatably supported by the housing 2.

Arranged concentrically within the central drive member 28 is an annular cam member 46 that is keyed against axial displacement relative to the central driving member by a split lock washer 48. The cam member 46 is provided at each end with cam teeth 46a (FIGS. 8–10) that engage corresponding cam teeth 24b and 26b (FIGS. 4 and 5) arranged on the adjacent faces of the clutch members 24 and 26, respectively.

As is known in the art, resilient holdout rings 50 and 52 are provided for temporarily maintaining an overrunning clutch member in a disengaged condition, as will be described in greater detail below. As shown in FIGS. 6 and 7, the holdout ring 52 is provided with a plurality of circumferentially-spaced holdout lugs 52a that extend axially toward the central lug projections 46b (FIG. 8) arranged on the periphery of the center cam 46 as is known in the art). The holdout ring 52 contains a slot 52b that receives the internal lug 28c (FIGS. 11 and 12), thereby limiting the extent of angular displacement of the holdout ring relative to the central driver member. Holdout ring 50 contains a similar slot for receiving the internal lug 28c.

Referring to FIGS. 13 and 14, each of the spring retaining members 36 and 38 is provided on its inner periphery with spline teeth 36a, 38a that correspond generally with the external spline teeth on the adjacent end of the side gears 20 and 22, respectively, thereby to permit initial axial mounting of the spring retainer members on the associated side gears, respectively.

Figure 15:
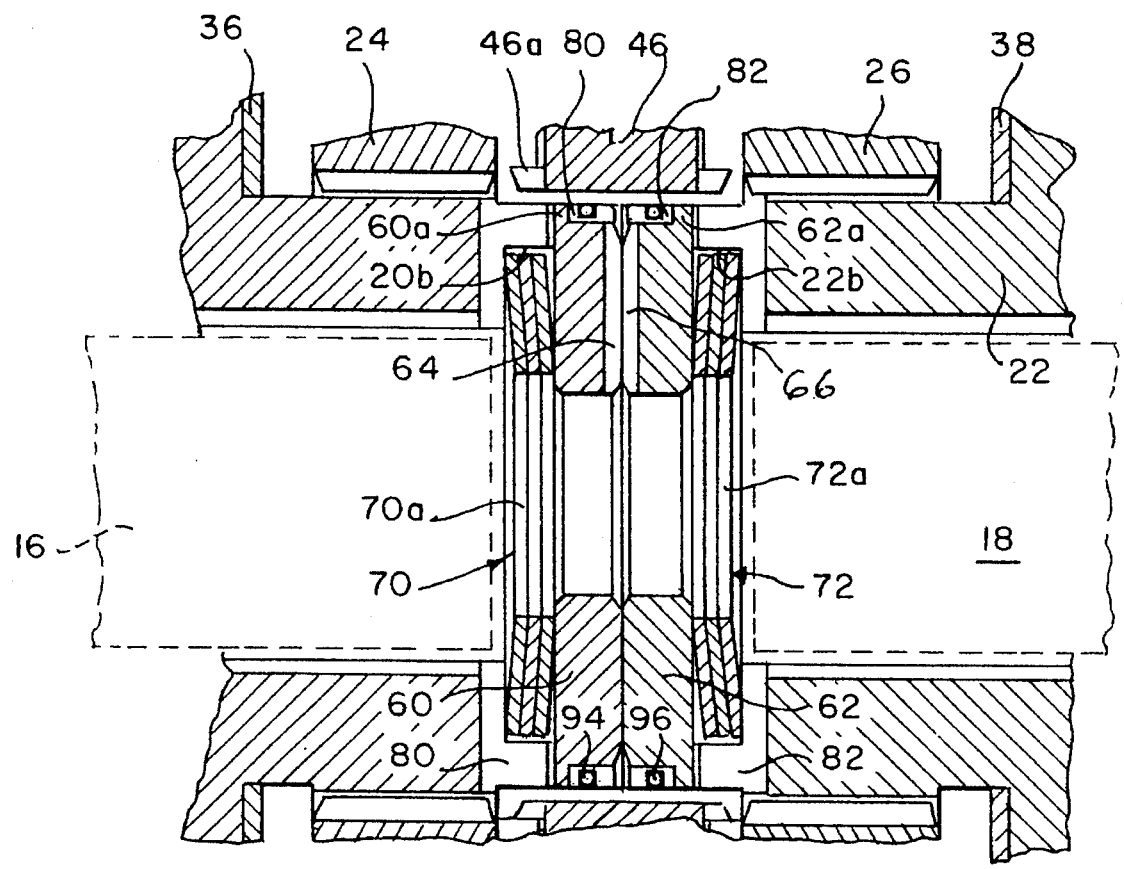
FIG. 15 is a detailed sectional view of the thrust block and Belleville spring biasing means of FIG. 1.

Referring now to FIG. 15, in accordance with a characterizing feature of the present invention, a pair of annular thrust block members 60 and 62 are arranged in contiguous engagement concentrically within the center cam member 46. The adjacent face of the thrust block members 60 and 62 contain radially extending lubrication grooves 64 and 66, and the remote faces of the thrust blocks are engaged by sets of Belleville disc-spring washers 70 and 72, respectively. The remote ends of the sets of Belleville washers are received by counterbore portions 20b and 22b contained in the adjacent ends of the side gears 20 and 22, respectively. As shown in FIG. 16, the thrust blocks are non-rotatably connected with the associated side gears by means of pairs of diametrically arranged radially outwardly extending projections 60a and 62a that are received in corresponding pairs of diametrically arranged axially extending slots 80 and 82 (FIG. 15) contained in the adjacent ends of the side gears 20 and 22, respectively. The configuration of each Belleville washer 70a and 72a of the washer sets 70 and 72 is shown in FIGS. 18 and 19.

Referring now to FIGS. 20–22, the thrust washers 40 and 42 arranged at the remote ends of the side gears 20 and 22 are formed of hardened steel and include diametrically opposed radially outwardly extending tab portions 40a and 42a that are received within corresponding recesses contained in the adjacent end walls of the housing chamber, thereby to capture and prevent rotation of the thrust washers relative to the housing 2. As shown in FIG. 20, the face of the thrust washer 40 adjacent the rib portion 20b of side gear 20 contains an elliptical lubrication groove 90. Thrust washer 42 contains a similar elliptical lubrication groove.

Figures 2, 3:
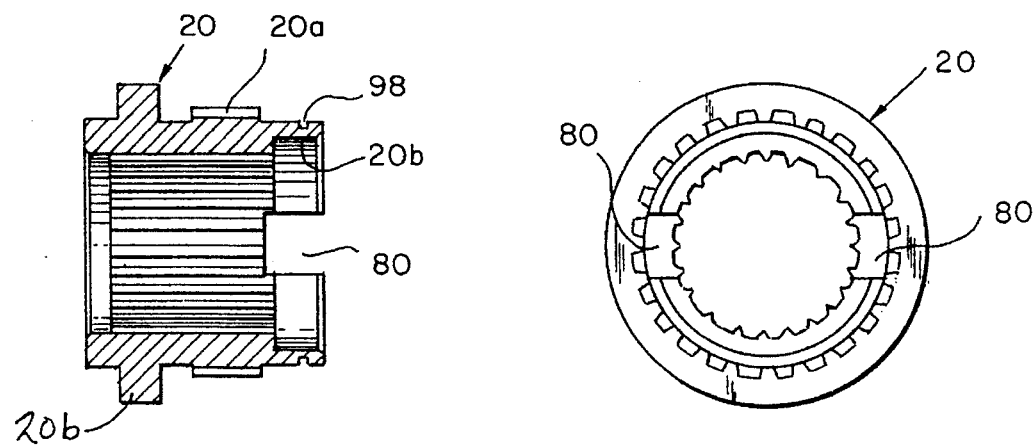
FIGS. 2 and 3 are longitudinal sectional and end views, respectively, of one of the side gears of FIG. 1.

Referring now to FIGS. 23 and 24, in order to retain the thrust block members 60 and 62 on the corresponding side gears 20 and 22, respectively, split resilient retaining rings 94 and 96 are provided that are snapped within corresponding locking grooves contained in the outer peripheral surfaces of the adjacent ends of the side gears (as shown, for example, by the groove 98 in FIG. 2).

OPERATION

Assume that the differential mechanism is initially in a disassembled condition, and that the housing sections 2a and 2b are unbolted and separated from each other. After the thrust washer 40 is non-rotatably mounted within the housing chamber, the side gear 20 is introduced, the spring retainer 36 being mounted on the side gear 20 in engagement with the rib portion 20b. Spring 32, clutch member 24 and holdout ring 50 are mounted in place, and the set of Belleville washers 70 and the thrust block 60 are retained in place by the split resilient retaining ring 94. The center driver member 28 and the cam member 46 are then positioned to slightly compress the compression spring 32. Similarly, the housing section 2b with the assembly including thrust washer 42, side gear 22, spring retainer 38, spring 34, clutch member 26 with the holdout ring 52 and the thrust block 62 and friction disk set 72 retained by split ring 96 are arranged as shown in FIG. 1. The bolts 10 are then tightened to fasten together the housing sections, with the result that the Belleville spring sets 70 and 72 are axially compressed to bias the side gears 20 and 22 axially apart into contiguous engagement with the thrust washers 40 and 42, respectively.

During normal driving conditions, the wheel shafts 16 and 18 are driven at the same speed by drive shaft 4 via pinion 6, ring gear 8, center drive member 28, clutch members 24 and 26, and side gears 20 and 22.

Assume now that the vehicle commences a left hand turn, whereupon the rotational velocity of the right wheel shaft 18 exceeds that of the left wheel shaft 16. Owing to the profiles of the cooperating cam teeth 46a of the center cam member 46 and the cooperating clutch teeth 26b of the right clutch member 26, the clutch member is cammed out to the right against the restoring force of biasing spring 34, thereby to disengage the clutch teeth 26a of the clutch member from the corresponding clutch teeth 28a of the central driving member 28. The right wheel shaft 18 is now free for rotation at a higher rotational velocity than the left wheel shaft 16 during the left turn of the vehicle. Owing to the biasing of the side gear members outwardly apart by the Belleville sets of washers, the chattering normally expected from such overrunning differentials is alleviated, whereby the noise level is significantly reduced. The right wheel shaft is maintained in a disengaged condition by the angularly displaced holdout ring 52 as long as the overrunning shaft condition exists. When the turn is completed and the output wheel shafts are again generally at the same rotational velocity, spring 34 biases clutch spring 26 to the left toward the engaged position relative to the centering driving member 28. The differential mechanism then resumes its initial non-overrunning driving condition.

Although the preferred embodiment of the invention has been illustrated and described as including sets of Belleville washers serving as the means for biasing the side gears outwardly apart into engagement with the thrust washers, it is contemplated that other resilient biasing means—such as compression springs, tension spring, resilient bodies and the like—might be used as well.

While in accordance with the provisions of the Patent Statutes the preferred form and embodiments of the invention have been illustrated and described and it will be apparent to those skilled in the art that various changes may be made without deviating from the invention set forth above.

What is claimed is:

1. A differential mechanism for rotatably driving a pair of aligned axially-spaced output shafts from a rotatably driven input shaft, comprising:

(a) a housing containing an internal chamber, said housing including a first pair of opposed openings communicating with said chamber for receiving said output shafts, respectively;

(b) a pair of aligned annular axially-spaced side gears arranged within said housing chamber adjacent said first pair of openings for non-rotatable connection with said output shafts, respectively;

(c) an annular center driving member rigidly connected with said housing at its outer periphery, said driving member being arranged between and in axially spaced relation to the adjacent ends of said side gears;

(d) clutch means normally connecting said center driving member with said side gears, respectively, said clutch means including a pair of annular clutch members mounted for axial displacement on said side gears on opposite sides of said center driving member, said clutch members being normally spring-biased inwardly together toward engaged positions relative to said center driving members, said clutch members and said center driving member having clutch teeth that are in engagement when said clutch members are in said engaged positions;

(e) cam means operable when one output shaft overruns the other by a predetermined amount for axially disengaging the clutch member associated with the overrunning shaft from said center driving member;

(f) holdout ring means for maintaining said overrunning clutch member in the disengaged condition as long as the output shaft associated therewith is in the overrunning condition;

(g) annular thrust block means arranged concentrically within said cam means between said side gears;

(h) a pair of annular thrust washers arranged between side gears and said housing, respectively; and (i) a pair of spring means arranged between said thrust block means and said side gears, respectively, for normally biasing said side gears axially apart toward continuous contiguous engagement with said thrust washers, respectively.

2. A differential mechanism as defined in claim 1, wherein said thrust block means comprises a pair of contiguous annular colinearly arranged thrust blocks the adjacent faces of which contain a plurality of radially extending lubricating grooves.

3. A differential mechanism as defined in claim 2, wherein each of said spring means comprises a set of Belleville disk springs.

4. A differential mechanism as defined in claim 3, wherein the adjacent ends of said side gears contain counterbores partially receiving the adjacent ends of the corresponding sets of disk springs, respectively.

5. A differential mechanism as defined in claim 4, wherein each of said thrust washers includes radially outwardly extending tab means for maintaining said thrust washer in fixed non-rotatable position relative to said housing.

6. A differential mechanism as defined in claim 5, wherein each of said side gears includes an annular face in contiguous engagement with the adjacent face of the corresponding thrust washer, said adjacent face of each thrust washer containing an elliptical lubrication groove affording continuous lubrication of the adjacent faces of said side gears and said thrust washers.

7. A differential mechanism as defined in claim 4, wherein said housing includes a pair of separable sections containing said first housing openings, respectively, thereby to afford access to said chamber for assembly of said differential mechanism, and further including retaining means for retaining together as a unit each side gear and the associated thrust block and Belleville disk spring set.

8. A differential mechanism as defined in claim 7, wherein the adjacent ends of said side of gears contain pairs of diametrically arranged longitudinally extending slots, and wherein said thrust blocks contain diametrically arranged pairs of peripheral projections that extend radially outwardly into said slots, respectively; and further wherein said retaining means is operable to retain said thrust block projections in said slots, respectively.

9. A differential mechanism as defined in claim 8, wherein the slotted end of each side gear contains on its outer periphery a circumferential groove intermediate the associated thrust block projection and the end extremity of said side block; and further wherein said retaining means includes resilient split retaining rings mounted in said grooves to retain said thrust block projections therein.

* * * * *